United States Patent [19]
Harada

[11] 3,871,749
[45] Mar. 18, 1975

[54] LENS SYSTEM HAVING MAGNIFICATION ×1
[75] Inventor: Kenichi Harada, Tokyo, Japan
[73] Assignee: Olympus Optical Company Limited, Tokyo, Japan
[22] Filed: June 11, 1973
[21] Appl. No.: 368,680

[30] Foreign Application Priority Data
June 20, 1972  Japan.............................. 47-61468

[52] U.S. Cl. .............................................. 350/215
[51] Int. Cl. ............................................. G02b 9/62
[58] Field of Search ........................... 350/215, 184

[56]  References Cited
UNITED STATES PATENTS
| 3,088,371 | 5/1963 | Lowenthal | 350/215 |
| 3,185,031 | 5/1965 | Betensky et al. | 350/215 |
| 3,439,976 | 4/1969 | Lynch | 350/215 |
| 3,687,522 | 8/1972 | Lynch et al. | 350/184 |

Primary Examiner—Vincent P. McGraw
Assistant Examiner—Conrad Clark
Attorney, Agent, or Firm—Waters, Roditi, Schwartz & Nissen

[57] ABSTRACT

The present invention relates to a modified orthometa type lens system having a magnification ×1. The lens system consists of a front lens group and a rear lens group separated by a diaphragm space. The front lens group consists of three lens elements. The first lens element is a positive meniscus lens. The second lens element is a negative meniscus lens. The third lens element is a positive meniscus lens. All of these lenses are convex toward an object side. The rear lens group consists of also three lens elements. The fourth lens element is a positive meniscus lens. The fifth lens is a negative meniscus lens. Lens element six is a positive meniscus lens. All of these lenses are convex toward an image side. The corresponding lens elements in both the front and rear lens groups have the same radius of curvature, thickness and air space, refractive index and Abbe numbers, that is, these lens elements are made completely symmetrical to each other with respect to the diaphragm and defined by the following four conditions, i.e., $0.01f < d_2 < 0.04f$,    1.
$1.9 < r_2/r_3 < 2.1$,    2.
$0.01f < d_4 < 0.03f$,    3.
and
$0.74 < r_4/r_5 < 0.81$.    4.

3 Claims, 7 Drawing Figures

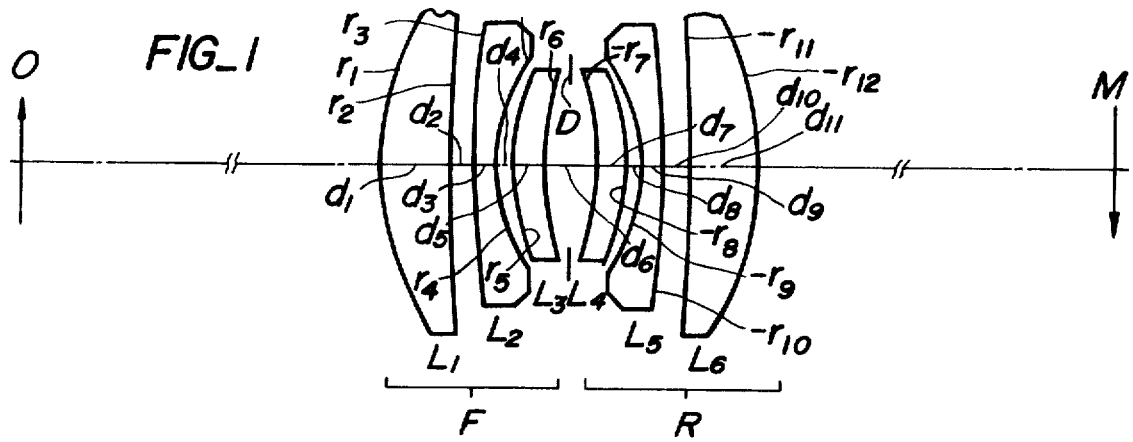
FIG_1
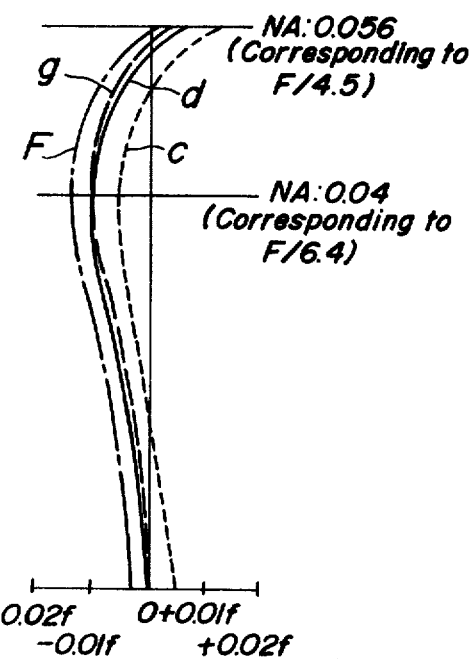
FIG_2a
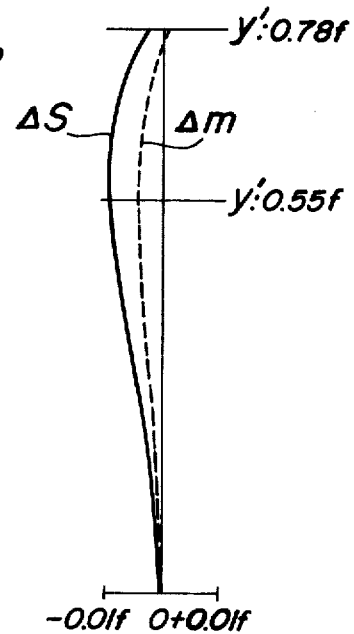
FIG_2b
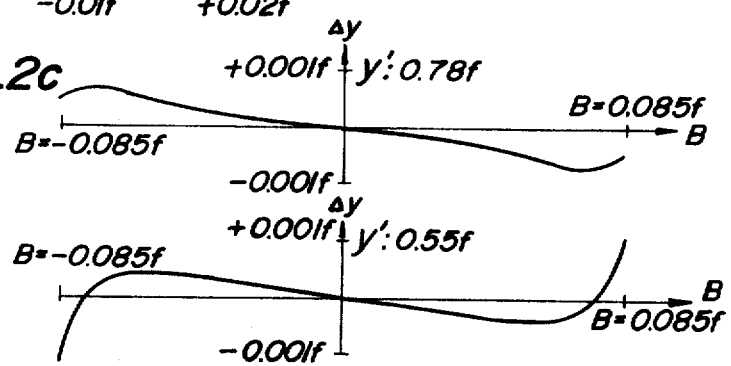
FIG_2c

FIG_3a
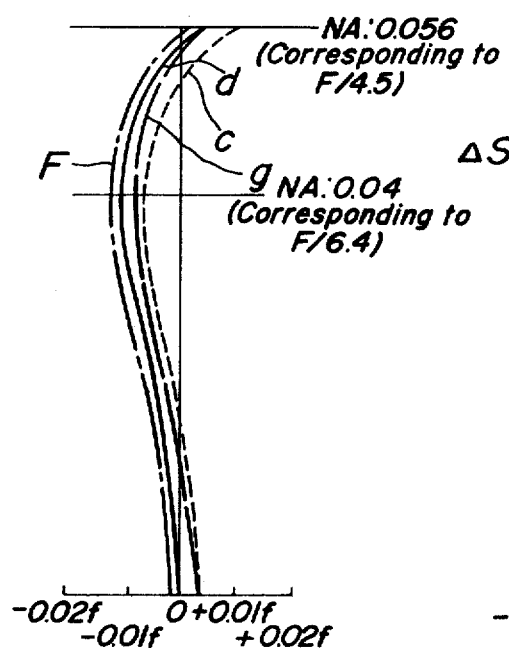
FIG_3b
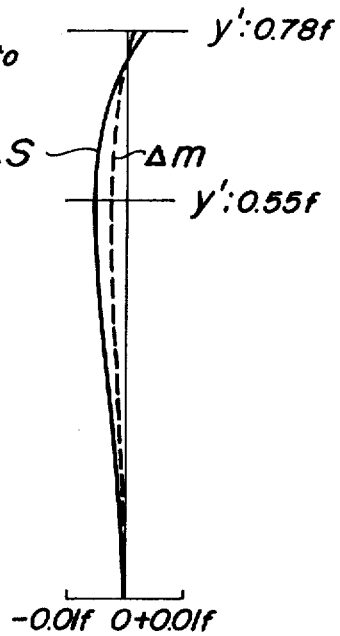
FIG_3c
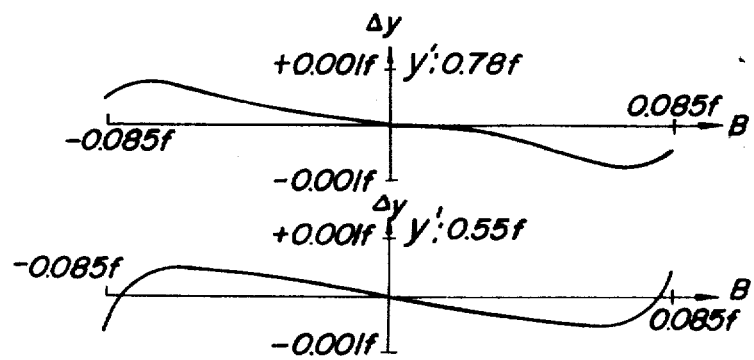

3,871,749

LENS SYSTEM HAVING MAGNIFICATION × 1

This invention relates to lens systems having magnification ×1 and more particularly to a modified orthometa type lens system having a magnification ×1 with a front lens group and a rear lens group separated by a diaphragm space, and front and rear lens groups being made completely symmetrical to each other with respect to the diaphragm. In general, it is impossible to design almost all of the orthometa type lens systems at aperture ratios higher than F/5.6, but these lens systems are designed to obtain a uniform projected image over a relatively large picture angle on the order of 70° for an infinitely distant object and on the order of 50° for a finitely distant object.

The orthometa type lens system which has been known in the prior art consists of a front lens group and a rear lens group separated by a diaphragm space and said front and rear lens groups are made substantially symmetrical to each other with respect to the diaphragm. Each of the front and rear lens groups consists of a doublet composed of a first positive lens and a second negative lens and of a third positive meniscus lens which is concave toward the diaphragm. Such lens system whose front and rear lens groups are made substantially symmetrical to each other with respect to the diaphragm can significantly correct magnification chromatic aberration and distortion, but has a disadvantage that it is difficult to correct spherical aberrations. As to why almost all of the orthometa type lens systems are designed to operate at aperture ratios higher than F/5.6, this seems to be due to the difficulty of correcting the spherical aberrations. In addition, why almost all of the orthometa type lens systems are designed to have a relatively large picture angle on the order of 70° for an infinitely distant object is considered due to the fact that the distortion can be corrected in a relatively favorable manner and that the projected image obtained is uniform up to the periphery thereof.

It has also been well known that if the lens system having lenses which are made symmetrical to each other with respect to the diaphragm is used to obtain an image with a magnification ×1, it is possible to completely eliminate the magnification chromatic aberration and distortion. As a result, computations of correcting various aberrations may be effected without taking the magnification chromatic aberration and distortion into consideration.

It is a matter of course that, in the orthometa lens system, the first positive lens is cemented onto the second negative lens and the sixth positive lens is cemented onto the fifth negative lens correspondingly for the purpose of mainly correcting the chromatic aberration.

The general object of the invention is to provide an improved lens system of the orthometa structure designed to operate with a picture angle on the order of 45°, at numerical apertures NA as high as 0.056 (corresponding to the aperture ratio F/4.46) and with substantial suppression of spherical aberration and other various aberrations and more particularly meridional transverse aberration.

The inventor has found in accordance with the invention that the foregoing object can be satisfied, with obtention of high-quality images, by the provision of a lens system of the character set forth in which the doublet is separated into two single lenses and two concave surfaces thus separated and air space therebetween are selectively determined for optimum correction of spherical aberrations.

A feature of the invention is the provision of a lens system having a magnification ×1 with a front lens group and a rear lens group separated by a diaphragm space, said front lens group consisting of a first positive meniscus lens, a second negative meniscus lens and a third positive meniscus lens, said lenses all being convex toward the object side, said rear lens group consisting of a fourth positive meniscus lens, a fifth negative meniscus lens and a sixth positive meniscus lens, said lenses all being convex toward the image side, said front and rear lens groups being made completely symmetrical to each other with respect to said diaphragm, and defined by the following four conditions, i.e., $0.01f < d_2 < 0.04f$,  1.
$1.9 < r_2/r_3 < 2.1$,  2.
$0.01f < d_4 < 0.03f$, and  3.
$0.74 < r_4/r_5 < 0.81$  4.

where $f$ is an overall focal length, $d_2$ an air space between the first positive meniscus lens and the second negative meniscus lens, $r_2$ a radius of curvature of the rear surface of the first positive meniscus lens, $r_3$ a radius of curvature of the front surface of the second negative meniscus lens, $d_4$ an air space between the second negative meniscus lens and the third positive meniscus lens, $r_4$ a radius of curvature of the rear surface of the second negative meniscus lens, and $r_5$ a radius of curvature of the front surface of the third positive meniscus lens.

Further objects, features and advantages of the invention will be apparent by reference to the following specification and the accompanying drawings, wherein FIG. 1 is a diagrammatic view of a preferred form of the invention;

FIGS. 2a, 2b and 2c are graphical representations of the spherical aberrations, astigmatisms and transverse aberrations, respectively, as related to the form of lens system described in Example 1 and shown in FIG. 1; and FIGS. 3a, 3b and 3c are graphical representations of the spherical aberrations, astigmatisms and transverse aberrations, respectively, as related to the form of lens system described in Example 2 and shown in FIG. 1.

With reference to FIG. 1 of the drawing, the preferred lens system consists of a front lens group F, consisting of a first positive meniscus lens $L_1$, a second negative meniscus lens $L_2$ and a third positive meniscus lens $L_3$, said lenses all being convex toward the object side 0, and a rear lens group R, consisting of a fourth positive meniscus lens $L_4$, a fifth negative meniscus lens $L_5$ and a sixth positive meniscus lens $L_6$, said lenses all being convex toward the image side M. In the space between the front lens group F and the rear lens group R, a diagrapham D is located.

As seen from the above and FIG. 1, the front lens group F and the rear lens group R are made completely symmetrical to each other with respect to the diaphragm D.

The computation treatments and experimental tests have yielded the result that the best correction for the various aberrations was obtained if the lens system shown in FIG. 1 was constructed according to the following four conditions, i.e., $0.01f < d_2 < 0.04f$,  1.
$1.9 < r_2/r_3 < 2.1$,  2.
$0.01f < d_4 < 0.03f$, and  3.

$0.74 < r_4/r_5 < 0.81$     4.

Both the conditions (1) and (2) preferentially correct the spherical aberrations. If $d_2$ is made smaller than the lower limit $0.01f$, the spherical aberrations for marginal light rays are excessively overcorrected. Conversely, if $d_2$ is made larger than the upper limit $0.04f$, the correction of the spherical aberrations for marginal light rays becomes insufficient. As seen from the above, the condition (1) insures an excellent correction of spherical aberrations for marginal light rays. But, the limitation of $d_2$ given by the condition (1) results in an increase of negative zonal spherical aberrations.

As a result, if it is desired to maintain a good image curvature, the optimum image position (at which the best contrast is obtained at the center of the image) is shifted toward the lens side with respect to the Gaussian image surface.

The condition (2) serves to overcome the above mentioned disadvantage inherent to the condition (1). The condition $1.9r_3<r_2$ reduces the zonal spherical aberration and the condition $r_2<2.1r_3$ changes the undercorrection of the meridional image curvature $\Delta m$ into substantially optimum correction and hence favors the flattening of the image.

The condition (3) relates to a correction of the saggital image curvature $\Delta S$. That is, if $d_4$ is made smaller than the lower limit $0.01f$, $\Delta S$ becomes undercorrected, particularly at an intermediate picture angle. Conversely, if $d_4$ is made larger than the upper limit $0.03f$, $\Delta S$ becomes overcorrected. Thus, the condition (3) together with the condition (2) favor the correction of the image curvature.

The condition (4) serves to significantly correct the transverse aberration out of axis. If $r_4/r_5$ is made larger than the upper limit 0.8., the transverse aberration symmetry at the periphery of the image becomes degraded and hence the transverse aberration becomes outward excessive, i.e., becomes excessive in its negative side. Conversely, if $r_4/r_5$ is made smaller than the lower limit 0.74, the transverse aberration becomes inward excessive, i.e., becomes excessive in its positive side.

The invention will now be described by reference to the following examples.

EXAMPLE 1

The lens system of the present example is shown in FIG. 1 and constructed according to the constructional data given herebelow.

| Lens | | Curvatures | | Thicknesses Spaces | $n$ | $v$ |
|---|---|---|---|---|---|---|
| F | L₁ | $r_1$ | 0.30656 | $d_1=0.07157$ | $n_1=1.6583$ | $v_1=57.3$ |
| | | $r_2$ | 2.34804 | $d_2=0.02599$ | | |
| | L₂ | $r_3$ | 1.13392 | $d_3=0.02534$ | $n_2=1.57309$ | $v_2=42.6$ |
| | | $r_4$ | 0.19298 | $d_4=0.01443$ | | |
| | L₃ | $r_5$ | 0.24003 | $d_5=0.03362$ | $n_3=1.64$ | $v_3=60.2$ |
| | | $r_6$ | 0.34976 | | | |
| | | Diaphragm D | | $d_6=0.05152$ | | |
| R | L₄ | $r_7=-r_6=-0.34976$ | | $d_7=d_5=0.03362$ | $n_4=n_3=1.64$ | $v_4=v_3=60.2$ |
| | | $r_8=-r_5=-0.24003$ | | $d_8=d_4=0.01443$ | | |
| | L₅ | $r_9=-r_4=-0.19298$ | | $d_9=d_3=0.02534$ | $n_5=n_2=1.57309$ | $v_5=v_2=42.6$ |
| | | $r_{10}=-r_3=-1.13392$ | | $d_{10}=d_2=0.02599$ | | |
| | L₆ | $r_{11}=-r_2=-2.34804$ | | $d_{11}=d_1=0.07157$ | $n_6=n_1=1.6583$ | $v_6=v_1=57.3$ |
| | | $r_{12}=-r_1=-0.30656$ | | | | |

Overall focal length  $f = 1.0$
Magnification  $\beta = -1\times$(Inverted Image)
Working Distance  $WD = -1.8$ (From Lens System to Object Side)
Numerical Aperture NA $= 0.056$
  Image Height $y' = 0.78$
  $d_2$ as defined by the condition 1)
    $= 0.02599$
  $r_2/r_3$ as defined by the condition 2)
    $= 2.0707$
  $d_4$ as defined by the condition 3)
    $= 0.01443$
  $r_4/r_5$ as defined by the condition 4)
    $= 0.804$ The various aberrations of the lens system according to the present example are shown in FIGS. 2a, 2b and 2c, respectively, in which FIG. 2a graphically represents the spherical aberrations for image rays in the d, g, C and F portion of the spectrum; FIG. 2b the meridional astigmatism $\Delta m$ and the saggital astigmatism $\Delta S$; and FIG. 2c the transverse aberrations $\Delta y$ at the image heights $y':0.78f$ and $y':0.55f$, respectively, in which the abscissa B shows the height at which the rays pass the diaphragm D.

EXAMPLE 2

The lens system of the present example is shown in FIG. 1 and constructed according to the constructional data given herebelow.

| Lens | Curvature | Thicknesses Spaces | $n$ | $v$ |
|---|---|---|---|---|
| F L₁ | $r_1=0.27185$ | $d_1=0.07462$ | $n_1=1.6228$ | $v_1=57.06$ |
|  | $r_2=1.74777$ | $d_2=0.0119$ |  |  |
| L₂ | $r_3=0.906$ | $d_3=0.03245$ | $n_2=1.57501$ | $v_2=41.49$ |
|  | $r_4=0.18255$ | $d_4=0.01618$ |  |  |
| L₃ | $r_5=0.24465$ | $d_5=0.05125$ | $n_3=1.64$ | $v_3=60.25$ |
|  | $r_6=0.34307$ | $d_6=0.0638$ |  |  |
| Diaphragm D |  |  |  |  |
| L₄ | $r_7=-r_6=-0.34307$ | $d_7=d_5=0.05125$ | $n_4=n_3=1.64$ | $v_4=v_3=60.25$ |
|  | $r_8=-r_5=-0.24465$ | $d_8=d_4=0.01618$ |  |  |
| R L₅ | $r_9=-r_4=-0.18255$ | $d_9=d_3=0.03245$ | $n_5=n_2=1.57501$ | $v_5=v_2=41.49$ |
|  | $r_{10}=-r_3=-0.906$ | $d_{10}=d_2=0.0119$ |  |  |
| L₆ | $r_{11}=-r_2=-1.74777$ | $d_{11}=d_1=0.07462$ | $n_6=n_1=1.6228$ | $v_6=v_1=57.06$ |
|  | $r_{12}=-r_1=-0.27185$ |  |  |  |

Overall focal length $f = 1.0$
Magnification $\beta = -1\times$ (Inverted Image)
Working Distance $WD = -1.772$ (From Lens System to Object Side)
Numerical Aperture $NA = 0.056$
Image Height $y' = 0.78$
$d_2$ as defined by the condition 1)
 $= 0.0119$
$r_2/r_3$ as defined by the condition 2)
 $= 1.9291$
$d_4$ as defined by the condition 3)
 $= 0.01618$
$r_4/r_5$ as defined by the condition 4)
 $= 0.7462$ The various aberrations of the lens system according to the present example are shown in FIGS. 3a, 3b and 3c, respectively, in which FIG. 3a graphically represents the spherical aberrations for image rays in the d, g, C and F portion of the spectrum; FIG. 3b the meridional astigmatism $\Delta m$ and the saggital astigmatism $\Delta S$; and FIG. 2c the transverse aberrations $\Delta y$ at the image heights $y':0.78f$ and $y':0.55f$, respectively, in which the abscissa B shows the height at which the rays pass the diaphragm D.

As seen from FIGS. 2a, 2b, 2c, 3a, 3b and 3c, the invention provides a lens system having a magnification $-1\times$ and large NA 0.056 corresponding to an aperture ratio F/4.5 and a high degree of correction of all the above-mentioned image aberrations such as spherical aberrations, astigmatisms, transverse aberrations, etc. In addition, all of the lenses are made completely symmetrical to each other with respect to the diaphragm so that the magnification chromatic aberration, distortion, etc., are completely eliminated.

What is claimed is:

1. A lens system having a magnification ×1 with a front lens group and a rear lens group separated by a diaphragm space, said front lens group consisting of a first positive meniscus lens, a second negative meniscus lens and a third positive meniscus lens, said lenses all being convex toward the object side, said rear lens group consisting of a fourth positive meniscus lens, a fifth negative meniscus lens and a sixth positive meniscus lens, said lenses all being convex toward the image side, said front and rear lens groups being made completely symmetrical to each other with respect to said diaphragm, and defined by the following four conditions, i.e., $0.01f < d_2 < 0.04f$, 1.
$1.9 < r_2/r_3 < 2\text{-}1$, 2.
$0.01f < d_4 < 0.03f$, 3.
and
$0.74 < r_4/r_5 < 0.81$ 4.

where $f$ is an overall focal length, $d_2$ an air space between the first positive meniscus lens and the second negative meniscus lens, $r_2$ a radius of curvature of the rear surface of the first positive meniscus lens, $rhd 3$ a radius of curvature of the front surface of the second negative meniscus lens, $d_4$ an air space between the second negative meniscus lens and the third positive meniscus lens, $r_4$ a radius of curvature of the rear surface of the second negative meniscus lens, and $r_5$ a radius of curvature of the front surface of the third positive meniscus lens.

2. A lens system having a magnification ×1 as claimed in claim 1 and constructed according to the constructional data given herebelow:

$f = 1.0$

| Lens | Curvatures | Thicknesses Spaces | $n$ | $v$ |
|---|---|---|---|---|
| L$_1$ | $r_1$  0.30656 | | | |
| | | $d_1$=0.07157 | $n_1$=1.6583 | $v_1$=57.3 |
| | $r_2$  2.34804 | | | |
| | | $d_2$=0.02599 | | |
| L$_2$ | $r_3$  1.13392 | | | |
| F | | $d_3$=0.02534 | $n_2$=1.57309 | $v_2$=42.6 |
| | $r_4$  0.19298 | | | |
| | | $d_4$=0.01443 | | |
| | $r_5$  0.24003 | | | |
| L$_3$ | | $d_5$=0.03362 | $n_3$=1.64 | $v_3$=60.2 |
| | $r_6$  0.34976 | | | |
| | Diaphragm D | | | |
| | | $d_6$=0.05152 | | |
| L$_4$ | $r_7$=−$r_6$=−0.34976 | | | |
| | | $d_7$=$d_5$=0.03362 | $n_4$=$n_3$=1.64 | $v_4$=$v_3$=60.2 |
| | $r_8$=−$r_5$=−0.24003 | | | |
| | | $d_8$=$d_4$=0.01443 | | |
| | $r_9$=−$r_4$=−0.19298 | | | |
| R L$_5$ | | $d_9$=$d_3$=0.02534 | $n_5$=$n_2$=1.57309 | $v_5$=$v_2$=42.6 |
| | $r_{10}$=−$r_3$=−1.13392 | | | |
| | | $d_{10}$=$d_2$=0.02599 | | |
| | $r_{11}$=−$r_2$=−2.34804 | | | |
| L$_6$ | | $d_{11}$=$d_1$=0.07157 | $n_6$=$n_1$=1.6583 | $v_6$=$v_1$=57.3 |
| | $r_{12}$=−$r_1$=−0.30656 | | | | wherein $r_1$ to $r_{12}$ inclusive designate the lens curvatures, $d_1$ to $d_{11}$ designate the lens thicknesses and air spaces, $n_1$ to $n_6$ designate the refractive index for the respective lenses and $v_1$ to $v_6$ designate the Abbe numbers of said lenses numbering from the front to the rear of said system.

3. A lens system having a magnification ×1 as claimed in claim 1 and constructed according to the constructional data given herebelow:

$f = 1.0$

| Lens | Curvatures | Thicknesses Spaces | $n$ | $v$ |
|---|---|---|---|---|
| L$_1$ | $r_1$=0.27185 | | | |
| | | $d_1$=0.07462 | $n_1$=1.6228 | $v_1$=57.06 |
| | $r_2$=1.74777 | | | |
| | | $d_2$=0.0119 | | |
| L$_2$ | $r_3$=0.906 | | | |
| F | | $d_3$=0.03245 | $n_2$=1.57501 | $v_2$=41.49 |
| | $r_4$=0.18255 | | | |
| | | $d_4$=0.01618 | | |
| | $r_5$=0.24465 | | | |
| L$_3$ | | $d_5$=0.05125 | $n_3$=1.64 | $v_3$=60.25 |
| | $r_6$=0.34307 | | | |
| | Diaphragm D | $d_6$=0.0638 | | |
| L$_4$ | $r_7$=−$r_6$=−0.34307 | | | |
| | | $d_7$=$d_5$=0.05125 | $n_4$=$n_3$=1.64 | $v_4$=$v_3$=60.25 |
| | $r_8$=−$r_5$=−0.24465 | | | |
| | | $d_8$=$d_4$=0.01618 | | |
| | $r_9$=−$r_4$=−0.18255 | | | |
| R L$_5$ | | $d_9$=$d_3$=0.03245 | $n_5$=$n_2$=1.57501 | $v_5$=$v_2$=41.49 |
| | $r_{10}$=−$r_3$=−0.906 | | | |
| | | $d_{10}$=$d_2$=0.0119 | | |
| | $r_{11}$=−$r_2$=−1.74777 | | | |
| L$_6$ | | $d_{11}$=$d_1$=0.07462 | $n_6$=$n_1$=1.6228 | $v_6$=$v_1$=57.06 |
| | $r_{12}$=−$r_1$=−0.27185 | | | | wherein $r_1$ to $r_{12}$ inclusive designate the lens curvatures, $d_1$ to $d_{11}$ designate the lens thicknesses and air spaces, $n_1$ to $n_6$ designate the refractive index for the respective lenses and $v_1$ to $v_6$ designate the Abbe numbers of said lenses numbering from the front to the rear of said system.

* * * * *